US012790209B2

(12) United States Patent
Slocum et al.

(10) Patent No.: US 12,790,209 B2
(45) **Date of Patent: *Nov. 10, 2026**

(54) CONTROLLING REACTABILITY OF WATER-REACTIVE ALUMINUM

(71) Applicant: LTAG SYSTEMS LLC, Bow, NH (US)

(72) Inventors: Alexander H. Slocum, Bow, NH (US); Jonathan T. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 534 days.

This patent is subject to a terminal disclaimer.

(21) Appl. No.: 18/498,815

(22) Filed: Oct. 31, 2023

(65) Prior Publication Data

US 2024/0286894 A1 Aug. 29, 2024

Related U.S. Application Data

(60) Division of application No. 17/730,475, filed on Apr. 27, 2022, now Pat. No. 11,840,451, which is a continuation of application No. 17/351,079, filed on Jun. 17, 2021, now Pat. No. 11,332,366.

(60) Provisional application No. 63/080,866, filed on Sep. 21, 2020, provisional application No. 63/070,242, filed on Aug. 25, 2020, provisional application No. 63/063,406, filed on Aug. 9, 2020.

(51) Int. Cl.
*C01B 3/08* (2026.01)

(52) U.S. Cl.
CPC .................................... *C01B 3/08* (2013.01)

(58) Field of Classification Search
CPC ................................ C01B 3/08; Y02E 60/36
See application file for complete search history.

(56) References Cited

U.S. PATENT DOCUMENTS

| | | | | |
|---|---|---|---|---|
| 11,332,366 | B2 * | 5/2022 | Slocum | C01B 3/08 |
| 2016/0355918 | A1 * | 12/2016 | Slocum | C23C 2/14 |
| 2021/0276865 | A1 * | 9/2021 | Meroueh | B01J 7/02 |

* cited by examiner

*Primary Examiner* — Yong L Chu

(74) *Attorney, Agent, or Firm* — The Marbury Law Group, PLLC

(57) ABSTRACT

Materials, kits, and methods are directed to controlling reactability of activated aluminum to produce hydrogen when exposed to water. For example, a moisture-stabilized material may be treatable with one or more additives to form a water-reactive source of hydrogen. The moisture-stabilized material may include a bulk volume including aluminum, at least one activation metal disposed along the aluminum within the bulk volume, the at least one activation metal more noble than the aluminum, and a salt along at least an outer surface of the bulk volume, the salt dissolvable in water to form an ion-containing solution at a rate faster than a reaction rate of water with the aluminum of the bulk volume.

8 Claims, 14 Drawing Sheets

CONTROLLING REACTABILITY OF WATER-REACTIVE ALUMINUM

CROSS-REFERENCE TO RELATED APPLICATIONS

This application is a divisional of U.S. patent application Ser. No. 17/730,475, filed Apr. 27, 2022, issued as U.S. Pat. No. 11,840,451, which is a continuation of U.S. patent application Ser. No. 17/351,079, filed Jun. 17, 2021, issued as U.S. Pat. No. 11,332,366, which claims priority to U.S. Provisional Pat. App. No. 63/063,406, filed Aug. 9, 2020, to U.S. Provisional Pat. App. No. 63/070,242, filed Aug. 25, 2020, and to U.S. Provisional Pat. App. No. 63/080,866, filed Sep. 21, 2020, with the entire contents of each of these applications hereby incorporated herein by reference.

BACKGROUND

Under normal environmental conditions, aluminum is covered with a protective oxide coating. This oxide coating forms rapidly in air and is stable. Thus, although aluminum is reactive with water to produce hydrogen and heat, the oxide coating on aluminum is an obstacle to using aluminum as a source of energy.

To overcome the impact of aluminum oxide on the water-reactivity of aluminum, aluminum can be treated to be in an activated form that yields a large amount of hydrogen and heat when reacted with water. With this combination of energy density and water-reactivity, activated aluminum is a volumetrically efficient and easily useable source of hydrogen. However, because it is subject to fouling by oxygen, water vapor, or other contaminants, activated aluminum can be challenging to handle, transport, and efficiently produce hydrogen under uncontrolled conditions associated with certain field applications. Furthermore, unless water with high purity is used to react with the activated aluminum, contaminants in the water reduce the efficiency of the reaction.

SUMMARY

According to one aspect, a moisture-stabilized material treatable with one or more additives to form a water-reactive source of hydrogen may include a bulk volume including aluminum, at least one activation metal disposed along the aluminum within the bulk volume, the at least one activation metal more noble than the aluminum, and a salt along at least an outer surface of the bulk volume, the salt dissolvable in water to form an ion-containing solution at a rate faster than a reaction rate of water with the aluminum of the bulk volume.

In some implementations, a ratio of a combined mass of the bulk volume and the at least one activation metal to a mass of the salt may be greater than zero and less than about 250:1.

In certain implementations, the aluminum of the bulk volume may include a cold-worked aluminum alloy that is plastically deformed and non-recrystallized. For example, the at least one activation metal may include a liquid metal alloy diffused along grain boundaries of the aluminum of the bulk volume. Additionally, or alternatively, the salt may be in crystalline form as grains.

In some implementations, the at least one activation metal may include indium and gallium.

In certain implementations, the salt may be deliquescent.

In some implementations, the salt may be sodium chloride, sodium bicarbonate, magnesium sulfate, or a combination thereof.

According to another aspect, a kit may include a container defining a volume; a moisture-stabilized material sealed in the volume of the container, the moisture-stabilized material activatable to form a water-reactive source of hydrogen, the moisture-stabilized material including a bulk volume including aluminum, at least one activation metal disposed along the aluminum within the bulk volume, the at least one activation metal more noble than the aluminum, and a salt along at least an outer surface of the bulk volume, the salt dissolvable in water to form a first aqueous solution in which the aluminum of the bulk volume has a first hydrogen yield, and an additive supported by the container apart from the moisture-stabilized material, the additive introducible to the first aqueous solution to form a second aqueous solution in which the aluminum of the bulk volume has a second hydrogen yield greater than the first hydrogen yield.

In certain implementations, the additive may be introducible to the first aqueous solution in the volume of the container.

In some implementations, the additive includes one or more metals. For example, the one or more metals may include iron, magnesium, or a combination thereof.

In certain implementations, the additive may include one or more food-grade consumables including dietary flavonoids. For example, the one or more food-grade consumables may include iced tea powder, garlic powder, coffee crystals, or a combination thereof.

In some implementations, the additive may include one or more acids. For example, the one or more acids may include citric acid, muriatic acid, ascorbic acid, uric acid, or a combination thereof.

According to yet another aspect, a method of producing hydrogen from water-reactive aluminum may include providing a material in a container, the material including a bulk volume including aluminum and at least one activation metal disposed along the aluminum within the bulk volume, and the at least one activation metal more noble than the aluminum, exposing a first aqueous solution to an additive the additive reducing volumetric concentration of ions in the first aqueous solution to form a second aqueous solution, and in the container, reacting the second aqueous solution with the aluminum of the bulk volume to produce reaction products including hydrogen.

In certain implementations, the first aqueous solution containing the ions may be saltwater.

In certain implementations, providing the material in the container may include dissolving a salt from an outer surface of the bulk volume such that the ions in the first aqueous solution include cations and anions dissolved from the salt.

In some implementations, the first aqueous solution may be exposed to the additive in the container.

In certain implementations, the additive may include one or more metals.

In some implementations, the additive may include one or more food-grade consumables including dietary flavonoids. For example, the one or more food-grade consumables include iced tea powder, garlic powder, coffee crystals, or a combination thereof.

In certain implementations, the additive may include one or more acids. For example, the one or more acids may include citric acid, muriatic acid, ascorbic acid, uric acid, or a combination thereof.

BRIEF DESCRIPTION OF THE FIGURES

Like reference symbols in the various drawings indicate like elements.

DETAILED DESCRIPTION

Figure 1A:
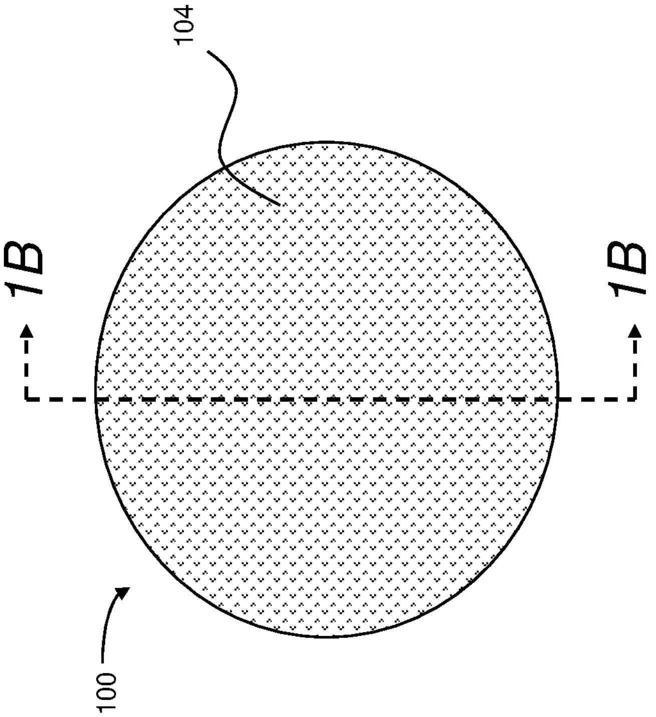
FIG. 1A is a side view of a moisture-stabilized material including activated aluminum, the moisture-stabilized treatable with an additive to form a water-reactive source of hydrogen.

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or." and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about." "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to elaborate upon the embodiments and does not pose a limitation on the scope of those embodiments. No language in the specification should be construed as indicating any unclaimed element as essential to the practice of the disclosed embodiments.

Using activated aluminum as a source of hydrogen and heat can present challenges with respect to the cost and robustness of the supply chain used to produce the activated aluminum and deliver it, with little or no spoilage, to an end-use location. Further, it may be desirable to use one or more local water sources at the end-use location to reduce, or eliminate, the need to carry water over long distances. While convenient, such local water sources may nevertheless contain high concentrations of ions (e.g., sodium and chlorine ions in the case of salt water such as seawater or brackish water sourced from the ocean or tidal areas or chlorine ions in the case of treated water from municipal water supplies) that can unpredictably and significantly decrease the effectiveness of activated aluminum as a source of hydrogen (e.g., by reducing hydrogen yield, increasing the time required for hydrogen production, or both). Accordingly, in the description that follows, various aspects of controlling reactability of activated aluminum are described. For example, certain materials, kits, and methods described herein relate to the use of safe and cost-effective material to stabilize activated aluminum with respect to moisture. Such improved stability of activated aluminum in the presence of moisture may reduce the likelihood of spoilage or other unintended degradation of the activated aluminum during storage, handling, and/or transport and, in doing so, may facilitate the use of supply chains with little or no need for specialized material handling. Additionally, or alternatively, some materials, kits, and methods described herein relate to the use of safe and cost-effective additives to counteract the influence of materials that interfere with the reaction of activated aluminum and water to produce hydrogen and heat. As described in greater detail below, increasing reactivity of activated aluminum may facilitate achieving high hydrogen yield in the presence of reaction inhibitors that are deliberately or inadvertently present.

In the disclosure that follows, aspects of various different materials, kits, and methods are generally described with respect to an exemplary use case in which the reactivity of activated aluminum is initially decreased to achieve moisture-stabilization (e.g., for transport) and one or more additives are later used to increase reactivity of the activated aluminum-counteracting the moisture stabilization and/or reaction inhibitors from local water sources—to achieve high hydrogen yield and fast reaction rate at or near the end-use location. It shall be appreciated that this is for the sake of clear and efficient description and in the interest of describing certain synergies that exist between moisture-stabilization to decrease reactivity and the use of one or more additives to increase reactivity of activated aluminum to form hydrogen. This shall not be understood to exclude other use cases. In particular, unless otherwise specified or made clear from the context, nothing in this disclosure shall be understood to exclude use cases in which any one or more of the additives described herein are used to increase reactivity of water-reactive aluminum that has not been moisture-stabilized.

As used herein, the terms "activated aluminum," "aluminum in an activated form." "water-reactive aluminum," "water-reactive material," and "water-reactive source of hydrogen" shall be understood to be interchangeable with one another, unless otherwise specified or made clear from the context, with the different terms being used to facilitate readability in different contexts. Further, unless a contrary intent is indicated, each of these terms shall be understood to include any manner and form of aluminum that may produce hydrogen upon exposure to water, with or without the addition of additional materials. Some examples of activated aluminum useable herein are set forth in U.S. Pat. No. 10,745,789, issued to Jonathan Thurston Slocum on Aug. 18, 2020, and entitled "Activated Aluminum Fuel," the entire contents of which are hereby incorporated herein by reference.

As used herein, the term "hydrogen yield" shall be understood to be the amount of hydrogen actually produced by a reaction of activated aluminum with water, expressed a percentage of a theoretical amount of hydrogen producible from a complete reaction of activated aluminum with water. Thus, higher hydrogen yield is generally desirable, given that such higher yields facilitate producing a given amount of hydrogen using less mass of activated aluminum-reducing cost and logistical burdens as compared to producing the same amount of hydrogen using lower-yielding activated aluminum.

Further, as used herein, the term "moisture stabilization" and variations thereof shall be understood to refer, generally, to a material including activated aluminum that has been treated with one or more materials to significantly and reversibly reduce hydrogen yield of the activated aluminum to reduce, in turn, the likelihood of unintended reaction (e.g., spoilation) of the activated aluminum as the material is inadvertently exposed to moisture during storage, handling, and transport to an end-use location. This furthermore increases the handling safety of the activated aluminum, given that the activated aluminum will not react rapidly if exposed to water. In this context, the lower hydrogen yield of a moisture-stabilized material shall be understood to be significant and reversible to the extent the hydrogen yield of the moisture-stabilized material is increasable (e.g., by a factor of 2 to 3) through the addition of one or more additives. The salt 104 may further, or instead, provide some reactivity stabilization to the activated aluminum collectively formed by the aluminum 106 and the at least one activation metal 108 in the bulk volume 102.

Figure 1B:
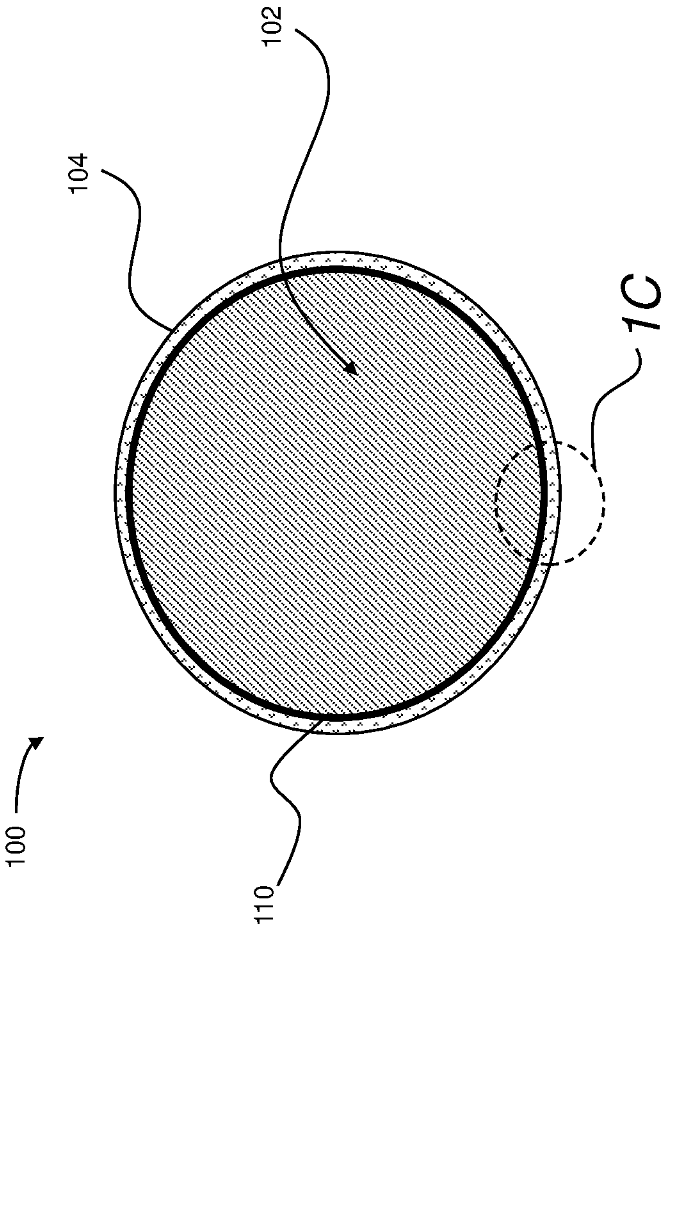
FIG. 1B is a cross-sectional side view of the moisture-stabilized material of FIG. 1A, the cross-section taken along the line 1B-1B in FIG. 1A.
Figure 1C:
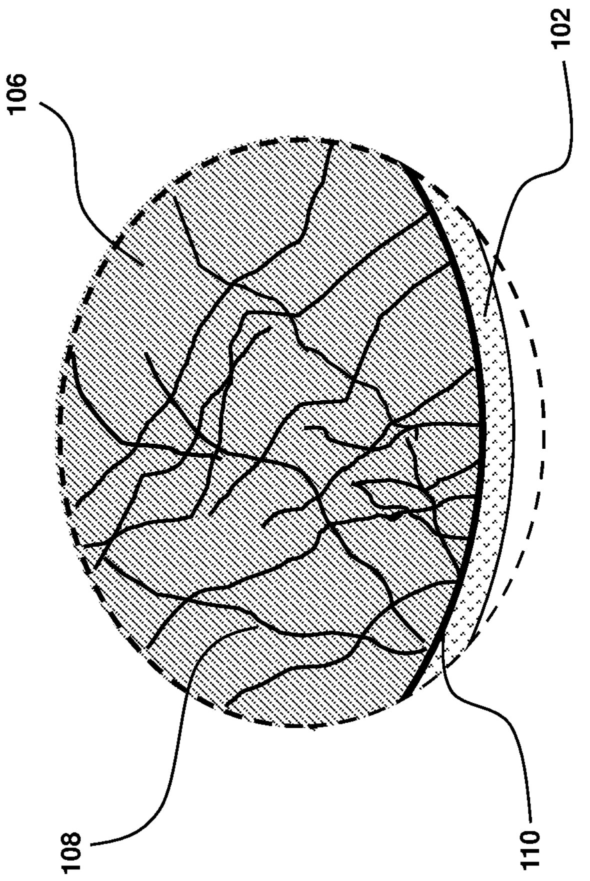
FIG. 1C is a close-up view of the cross-sectional view of the moisture-stabilized material along area of detail 1C of FIG. 1B.

Referring now to FIGS. 1A-1C, a moisture-stabilized material 100 may include a bulk volume 102 and a salt 104. The bulk volume 102 may include aluminum 106 and at least one activation metal 108 disposed along the aluminum 106. Unless otherwise specified or made clear from the context, the aluminum 106 shall be understood to be raw (unoxidized) aluminum, and the at least one activation metal 108 may prevent the formation of an oxidation layer that would otherwise form on the aluminum 106. For example, the at least one activation metal 108 may include a liquid metal (e.g., a liquid metal alloy) diffused along grain boundaries of the aluminum 106 such that water may come into contact with the aluminum 106 via the grain boundaries wetted with the at least one activation metal 108. In general, the combination of the aluminum 106 and the at least one activation metal 108 in the bulk volume 102 is collectively referred to herein as activated aluminum (or one or more of the variants discussed above). While the robustness of the reaction of water and the aluminum 106 of the bulk volume 102 to form hydrogen can have significant advantages with respect to the efficient delivery of hydrogen for field applications, the same robustness can be associated with inadvertent production of hydrogen (e.g., in a humid atmosphere) prior to an intended time and location of use. Accordingly, to facilitate decoupling robustness of reactivity of the activated aluminum from considerations associated with storage, handling, and transport, the salt 104 may be disposed along at least an outer surface 110 (e.g., an oxidation layer about the aluminum 106) of the bulk volume 102, where the salt 104 may provide moisture stabilization to the activated aluminum collectively formed by the aluminum 106 and the at least one activation metal 108 in the bulk volume 102.

In use, the salt 104 may be dissolvable in water to form an ion-containing solution at a rate faster than a reaction rate of water with the aluminum 106 in the presence of the at least one activation metal 108 in the bulk volume 102. As described in greater detail below, a high concentration of ions in the ion-containing solution rapidly formed through dissolution of the salt 104 may significantly impede the progress of the hydrogen-producing reaction of water and the activated aluminum of the bulk volume 102. As also described in greater detail below, the resistance of the moisture-stabilized material 100 to reaction with water may be readily reversed in the field using any one or more of a variety of safe and ubiquitous materials including, significantly, food-grade consumables such as those containing flavonoids. Thus, as compared to activated aluminum alone, the presence of the salt 104 may facilitate storage, handling, and transporting the moisture-stabilized material 100 with fewer, if any, specialized accommodations, thus making the moisture-stabilized material 100 well-suited for delivery to various end-use locations using regular supply chains.

In general, the salt 104 may include an ionic assembly of cations and anions, with the ionic assembly dissociable in water into the anionic and cationic components. Without wishing to be bound by theory, it is believed that micro-galvanic cells are formed between grains of the aluminum 106 (less noble metal) and the at least one activation metal 108 (more noble metal) wetted along the grain boundaries and, when more of these cells come into contact with water (thus completing the circuit), the reaction rate increases. Thus, again without wishing to be bound by theory, it is believed that the experimentally observed reduction in hydrogen yield in the presence of salt dissolved in water may be attributable to one or both of the anions or cations in the aqueous solution interfering with the micro-galvanic circuits. As described in greater detail below, some examples of the salt 104 may include sodium chloride (NaCl, commonly known as table salt), sodium bicarbonate ($NaHCO_3$, commonly known as baking soda), magnesium sulfate (e.g., in a hydrate form such as the heptahydrate $MgSO_4 \cdot 7H_2O$, commonly known as Epsom salt), or a combination thereof. As may be appreciated from these examples, the salt 104 may be a safe and ubiquitous material that may be inexpensively sourced off-the-shelf, without specialized purity requirements.

In certain implementations, the salt 104 may have a high melting point (well above 100° C.) such that the salt 104 is in crystalline form as grains at temperatures typically associated with storage, handling, and transporting the moisture-stabilized material 100 to an end-use location, making heat-related deterioration of the salt 104 unlikely. Further, or instead, the salt 104 may be deliquescent. That is, for example, the salt 104 may absorb some amount of moisture in an environment about the moisture-stabilized material 100 while the bulk properties of the salt 104 allow the salt 104 to remain about the outer surface 110 of the bulk volume 102.

Given that the salt 104 may include safe and low-cost materials that are stable over typical conditions associated with supply chains, an upper bound of the amount of the salt 104 included in the moisture-stabilized material 100 may be limited by considerations related to portability and field-use of the moisture-stabilized material 100. For example, the amount of the salt 104 included in the moisture-stabilized material 100 may be limited based on consideration of the contribution of the weight of the salt 104 to the overall weight of the moisture-stabilized material 100. Additionally, or alternatively, the amount of the salt 104 included the moisture-stabilized material 100 may be limited based on the amount of an additive required to be transported to and/or procured at the end-use location to reverse the moisture-stabilization of the salt 104 such that the aluminum 106 may react with water to produce a high hydrogen yield (e.g., greater than about 85 percent). That is, greater amounts of the salt 104 included in the moisture-stabilized material 100 require greater amounts of the corresponding additive required to reverse the moisture-stabilization at the end-use location. Thus, as may be appreciated from the foregoing, the amount of the salt 104 included in the moisture-stabilized material 100 may be generally considered to have a practical upper bound related to the overall weight of material required to be transported and a practical lower bound related to effectiveness in achieving robust moisture-stabilization of the moisture-stabilized material 100 throughout a range conditions. Based on these bounds, the ratio of the combined mass of bulk volume 102 and the at least one activation metal 108 to the mass of the salt 104 may be greater than zero and less than about 250:1, with variability on the high end of the range allowing for variation in composition of the aluminum 106.

In certain implementations, the outer surface 110 of the bulk volume 102 may be an aluminum oxide layer that forms on the aluminum 106 exposed to air. Such an aluminum oxide layer is stable, making it a useful substrate along which the salt 104 may be superficially disposed. While the salt 104 may be adhered to the outer surface 110, it shall be understood that the moisture-stabilized material 100 may be a mixture in which the salt 104 is in contact with and movable along at least a portion of the outer surface 110, as described in greater detail below. Further, to the extent the outer surface 110 of the bulk volume 102 includes an aluminum oxide layer, the stability of such a layer provides an additional barrier between the aluminum 106 in the bulk volume 102 and environmental moisture outside of the bulk volume 102. However, in instances in which the outer surface 110 of the bulk volume 102 includes an aluminum oxide layer, such a layer may include disruptions that facilitate penetration of the at least one activation metal 108 along grain boundaries of the aluminum 106 and allow for initial penetration of water into contact with the aluminum 106 during an intended reaction. Accordingly, while each of the salt 104 and an aluminum oxide layer along the outer surface 110 of the bulk volume 102 may be individually penetrable by water, it shall be appreciated that the combination of the salt 104 and the aluminum oxide layer may significantly restrict unintended water ingress into the aluminum 106 of the bulk volume 102.

In general, the aluminum 106 may include any one or more of various different aluminum alloys. Prior to exposure to the at least one activation metal 108, the aluminum 106 may be greater than about 85 percent, by mass, of the bulk volume 102. For example, the aluminum 106 may include 7075 T6 aluminum alloy, which is about 87 percent to about 91 percent aluminum alloy by mass. Additionally or alternatively, the aluminum 106 can include aluminum alloys having a higher percentage of aluminum than the percentage found in 7075 aluminum alloy. The remainder of the mass of the aluminum 106 prior to exposure to the eutectic alloy, may include impurities.

In certain implementations, the aluminum 106 of the bulk volume 102 may have misaligned grains and, thus, a high energy grain boundary (e.g., greater than about 0.5 $J/m^2$), such as a grain boundary characteristic of a cold-worked aluminum alloy that is plastically deformed and non-recrystallized. The plastic deformation that occurs during cold working can advantageously yield more surface cracks and initiation sites on the outer surface 110 of the bulk volume 102 to facilitate diffusion of the at least one activation metal 108 along the grain boundaries of the aluminum 106 of the bulk volume 102. Cold working, as used herein, includes rolling, bending, shearing, drawing, stamping, forging, extruding, cold shaping, cold forming, and/or otherwise plastically deforming (such that it does not recrystallize the aluminum) the aluminum 106 prior to exposure to the eutectic alloy. Thus, it shall be appreciated from the foregoing that the aluminum 106 of the bulk volume 102 may be sourced from scrap, such as aluminum from recycled beverage cans or other aluminum sources containing impurities. To the extent hydrogen yield from the aluminum 106 is adversely impacted by certain types of impurities (e.g., copper) that may be common in recycled aluminum, one or more additives used to reverse the moisture-stabilization of the moisture-stabilized material 100 may also neutralize such impurities, as described in greater detail below with respect to the experimental results.

The at least one activation metal 108 may be more noble than the aluminum 106 of the bulk volume 102. With such a difference in nobility between the aluminum 106 and the at least one activation metal 108, the aluminum 106 may react slowly such that the aluminum 106 remains stable in low-humidity, oxygen environments, while also being highly reactive in water. Further or instead, the introduction of water at an interface between the at least one activation metal 108 and the aluminum 106 may result in corrosion (e.g., spalling corrosion) which exposes more of the aluminum 106 of the bulk volume 102 to the water interface, thus promoting progression of the reaction between water and the aluminum 106 to form hydrogen and heat. As an example, the at least one activation metal 108 may include a eutectic alloy, such as an indium-gallium eutectic. Continuing with this example, the indium-gallium eutectic may be about 22 percent by mass indium and about 78 percent by mass gallium, with the indium percentage varying±5 percent. In certain instances, the indium-gallium eutectic may include one or more additional metals, such as tin.

Figure 1D:
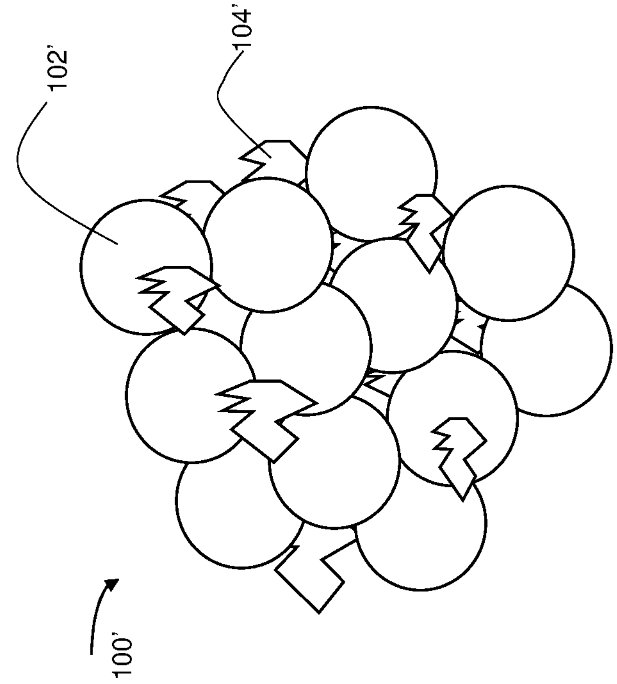
FIG. 1D is a schematic representation of a moisture-stabilized material including a plurality of bulk volumes interspersed with a salt, with each bulk volume including aluminum and at least one activation metal wetted along grain boundaries of the aluminum.

While the moisture-stabilized material 100 may be a discrete object in some instances, it shall be appreciated that other form factors of moisture-stabilized material are additionally, or alternatively, possible. For example, referring now to FIG. 1D, a moisture-stabilized material 100' may include a plurality of instances of a bulk volume 102' and a salt 104' (e.g., table salt, Epsom salt, baking soda, or a combination thereof) interspersed between the plurality of instances of the bulk volume 102'. The moisture-stabilized material 100' may be, in some instances, a flowable mixture of the plurality of instances of the bulk volume 102' and the salt 104'. For the sake of efficient description, elements with prime (') element numbers in FIG. 1D shall be understood to be similar to elements with corresponding unprimed element numbers in FIGS. 1A-1D and are not described, separately, except to point out certain differences or to emphasize certain aspects. Thus, for example, each instance of the bulk volume 102' shall be understood to be analogous to the bulk volume 102 (FIGS. 1A-1C) such that each instance of the bulk volume 102' includes aluminum having at least one activation metal wetted along grain boundaries of the aluminum, as described above with respect to the bulk volume 102 in the description of FIGS. 1A-1C.

In use, as the moisture-stabilized material 100' is exposed to water, the salt 104' may dissolve far faster than activated aluminum in the plurality of instances of the bulk volume 102' can react with the water. Accordingly, the salt 104' interspersed between the plurality of instances of the bulk volume 102' may absorb the moisture and protect the activated aluminum in the plurality of instances of the bulk volume 102'. Or, in the presence of large amounts of water, the salt 104' may dissolve before the activated aluminum of the plurality of instances of the bulk volume 102' such that the reaction of the activated aluminum with water becomes slow and has a low hydrogen yield, such as to mildly fizzle, thus reducing the likelihood of danger or usefulness. An analogous effect may occur when the moisture-stabilized material 100, described above with respect to FIGS. 1A-1C, is exposed to water. As described in greater detail below, however, this effect may be reversed through the use of one or more additives that restore the usefulness of the activated aluminum as a hydrogen source. Accordingly, the moisture-stabilized material 100 (FIGS. 1A-1C) and/or the moisture-stabilized material 100' may be contained in a container for shipping or transport of the activated aluminum with few, if any, safety concerns.

Having described various aspects of the moisture-stabilized material 100 that facilitate stability under conditions that may be encountered in supply chains extending to remote field applications, attention is now directed to reversal of the moisture stabilization of the moisture-stabilized material 100 at or near a point of end-use. That is, to the extent the salt 104 may be analogized to poisoning the hydrogen-producing reaction of the aluminum 106 with water, the following description is directed to providing an additive that may be analogized to an antidote-namely, the additive may generally counteract the effect of the salt 104 and, in doing so, may restore reactability of the activated aluminum in the bulk volume 102 such that the aluminum 106 may be reacted with water at the end-use location to produce hydrogen with a high hydrogen yield (e.g., greater than 80 percent). In the description that follows, the relationship between the moisture-stabilized material 100 and the additive are described with respect to the important use-case in which these materials are part of a kit that is transportable to an end-use location. It shall be appreciated, however, that this is for the sake of clarity, and that the moisture-stabilized material 100 and the additive may be separately packaged and/or transported to an end-use location without departing from the scope of the present disclosure. For example, as described in greater detail below, the additive may include one or more food-grade consumables that may be separately packaged (e.g., as part of food provisions carried by personnel to the end-use location). Further, or instead, while reactions are described below as being carried out in a container of a kit that carries the moisture-stabilized material 100 and the additive, it shall be understood that one or more of such reactions may be carried out in a separate receptacle, such as may be useful for sizing the kit for portability and/or for reusing receptacles.

Figure 2A:
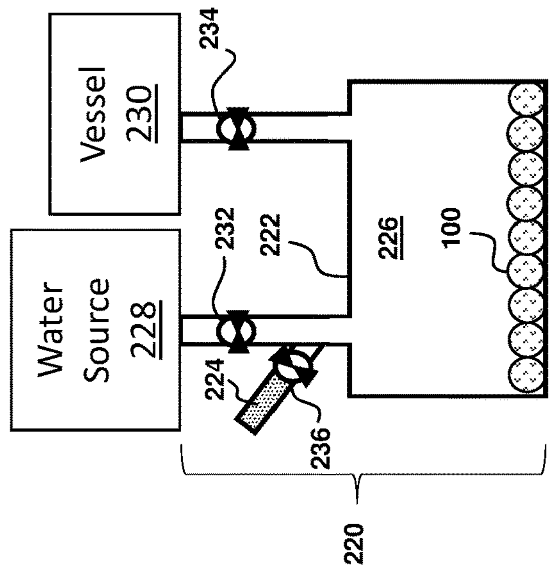
FIG. 2A-2C are schematic representations of a kit including the moisture-stabilized material of FIG. 1A and an additive, the schematic representations collectively depicting a temporal sequence of using the kit to form a hydrogen-containing gas.
Figure 2B:
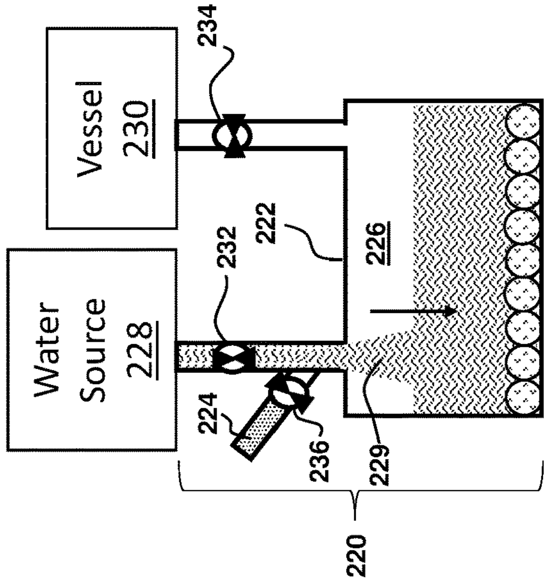
Figure 2C:
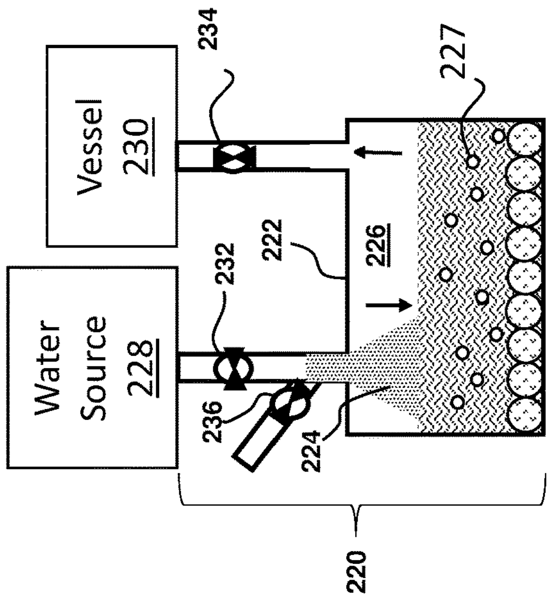

FIGS. 2A-2C collectively depict a temporal sequence of using a kit 220 to form a hydrogen-containing gas for an end-use such as providing a lifting gas to an inflatable structure, powering a fuel cell, powering an internal combustion engine, or any other use for hydrogen, steam, heat, or a combination thereof. The kit 220 may include one or more instances of the moisture-stabilized material 100, a container 222, and an additive 224. The one or more instances of the moisture-stabilized material 100 may be in a volume 226 defined by the container 222. The additive 224 may be supported by the container 222 at a position away from the one or more instances of the moisture-stabilized material 100 to reduce the likelihood that the additive 224 may prematurely reverse the moisture protection afforded by the moisture-stabilized material 100. As compared to separately carrying and sourcing an additive, having the additive 224 supported by the container 222 may reduce the likelihood of starting a reaction without a sufficient quantity of the additive 224 available to achieve a high hydrogen yield.

Referring now to FIGS. 1A-1C and FIG. 2A, the volume 226 may be initially sealed. It shall be appreciated that the quality of the seal may provide at least some additional or alternative protection against moisture prematurely reaching the one or more instances of the moisture-stabilized material 100 in the volume 226. For example, the one or more instances of the moisture-stabilized material 100 may be sealed in the volume 226 with a gas-tight seal. In such implementations, the moisture stabilization provided by the moisture-stabilized material 100 may provide protection against inadvertent hydrogen production in the event of failure of the gas-tight seal and/or a puncture of the container 222, such as may occur through rough handling en route to the end-use location.

At the end-use location, the container 222 may be coupled to a water source 228 and a vessel 230. Valving may be used to control fluid communication between the volume 226 and each one of the water source 228 and the vessel 230. For example, a first valve 232 may be between the water source 228 and the volume 226 of the container 222, and a second valve 234 may between the vessel 230 and the volume 226 of the container 222. The first valve 232 and the second valve 234 may be, for example, manually operable by personnel at the end-use location. While such a valving arrangement offers certain advantages with respect to robustness and ease of operation, it shall be appreciated that any one or more of various different other valving arrangements may be used to provide suitable control over the introduction of material into the volume 226 and the issuance of hydrogen-containing gas from the volume 226, without departing from the scope of the present disclosure.

The water source 228 may be any one or more of various different types of water, and does not require any particular purity or quality. To the extent THE water 229 in the water source 228 contains contaminants that impede hydrogen production, the additive 224 may counteract (e.g., neutralize) such contaminants to make the water 229 suitable for hydrogen production with a high hydrogen yield, as described in greater detail below. In particular, using the additive 224, the water 229 in the water source 228 may include local water having a high concentration of ions. That is, the water 229 in the water source 228 may include salt water (nominally 35 parts per thousand (ppt) salt) from the sea, brackish water (0.5 to 30 ppt salt) from an estuary, well water, highly chlorinated water, or any combination thereof. This is quite significant at least because it reduces, or even eliminates, the need to transport the water 229 over long distances to the end-use location to produce hydrogen, thus saving substantial logistical resources.

The vessel 230 may be any one or more of various different types of vessels associated with end-use of the hydrogen, whether as a lifting gas and/or as fuel for chemical conversion in the production of power. Additionally, or alternatively, the vessel 230 may be an intermediate vessel, such as a high-pressure gas tank, in which hydrogen-containing gas may be stored for subsequent use.

Referring now to FIGS. 1A-1C and FIG. 2B, the second valve 234 may be opened to establish fluid communication between the water source 228 and the volume 226 of the container 222 such that the water 229 may flow onto the one or more instances of the moisture-stabilized material 100 in the volume 226. As the one or more instances of the moisture-stabilized material 100 in the volume 226 come into contact with the water 229, the salt 104 of the one or more instances of the moisture-stabilized material 100 in the volume 226 may dissolve to form a first aqueous solution in which the aluminum 106 associated with the one or more moisture-stabilized materials 100 has a first hydrogen yield. At least because of the dissolution of the salt 104 in the water 229, this first aqueous solution has a high ionic concentration that generally inhibits the reaction of the activated aluminum with the water 229 to form hydrogen. Further, the water 229 itself may have a high concentration of ions (e.g., as is the case with salt water) that may further inhibit the reaction of the activated aluminum with the water 229 to form hydrogen. Accordingly, prior to the introduction and significant mixing of the additive 224 into the volume 226, only a small amount of hydrogen, if any, is produced in the volume 226.

Referring now to FIGS. 1A-1C and FIG. 2C, the additive 224 may be directed into the volume 226 of the container 222 before, during, or after the water 229 is introduced into the volume 226. However, for the sake of clarity, the addition of the water 229 (FIG. 2B) and the additive 224 (FIG. 2C) are shown and described as discrete steps, such as may be useful for single-operator operation of the kit 220. For example, a third valve 236 may be initially between the volume 226 and the additive 224, with the third valve 236 in a closed position to fluidically isolate the additive 224 from the volume 226 and, thus, from the one or more instances of the moisture-stabilized material 100 disposed in the volume 226. Continuing with this example, the additive 224 may be introduced into the volume 226 through actuation of the third valve 236 such that at least a portion of the additive 224 may be introducible into the first aqueous solution including the water 229 and ionic content from at least dissolution of the salt 104. As the additive 224 is introduced into the first aqueous solution (e.g., after or during formation of the first aqueous solution), the additive 224 may interact with the constituents of the first aqueous solution to form a second aqueous solution in which the aluminum 106 associated with the one or more instances of the moisture-stabilized material 100 has a second hydrogen yield, greater than the first hydrogen yield. As the aluminum 106 reacts in the second aqueous solution hydrogen bubbles 227 may rise and be directed to do useful work.

Without wishing to be bound by theory, it is believed the additive 224 may significantly improve hydrogen yield by advantageously acting to effectively neutralize the ions in the first aqueous solution such that the second aqueous solution has a low concentration of ions that would otherwise interfere with the reaction of water and the activated aluminum of the one or more instances of the moisture-stabilized material 100 to form hydrogen. Thus, for example, the additive 224 may include one or more metals (e.g., iron, magnesium, or a combination thereof) that are preferentially corrodible relative the aluminum 106, thus serving to remove ions from the first aqueous solution as the one or more metals corrode. Examples of such metals to promote the efficient reaction of activated aluminum and water are described in U.S. patent application Ser. No. 17/177,144, filed Feb. 16, 2021, and entitled “CONTROLLING HYDROGEN PRODUCTION FROM WATER-REACTIVE ALUMINUM,” the entire contents of which are hereby incorporated herein by reference. Further, improvement in hydrogen yield has been experimentally observed using dietary flavonoids (e.g., bioflavonoids) as well as acids, as described in greater detail below. As also described in greater detail below, the use of such materials as the additive 224 may facilitate sourcing the additive 224 from a variety of abundant and inexpensive sources, particularly food-grade consumables.

While the use of the kit 220 has been described as being used with one or more instances of the moisture-stabilized material 100. It shall be readily appreciated that the kit 220 may additionally or alternatively include the moisture-stabilized material 100' (FIG. 1D), with operation of the kit 220 being the same in each case.

Further, or instead, while the moisture-stabilized material 100 and/or the moisture-stabilized material 100' may be stored, shipped, and/or reacted in the kit 220, other types of containers may additionally or alternatively be used. For example, the moisture-stabilized material 100 and/or the moisture-stabilized material 100' (FIG. 1D) may be contained in a container such as a mason jar, sealed in a can (e.g., a paint can) or vacuum packed bag, and the additive 224 may be separately packaged for shipment or transport. When desired, the container containing the moisture-stabilized material 100 (and/or the moisture-stabilized material 100' of FIG. 1D) and the container containing the additive 224 may be opened and combined into a reaction chamber of a different type, such as a flexible reaction chamber (e.g., as described in U.S. patent application Ser. No. 17/115,437, filed Dec. 8, 2020, and entitled “STORING ACTIVATED ALUMINUM”) to combine with water at hand to produce hydrogen or, if the water to activated aluminum ratio is of the order of 7-10, to generate significant steam with hydrogen. Before the steam condenses, it may be used with the hydrogen to do additional work, such as inflating a balloon to loft a payload.

Figure 3:
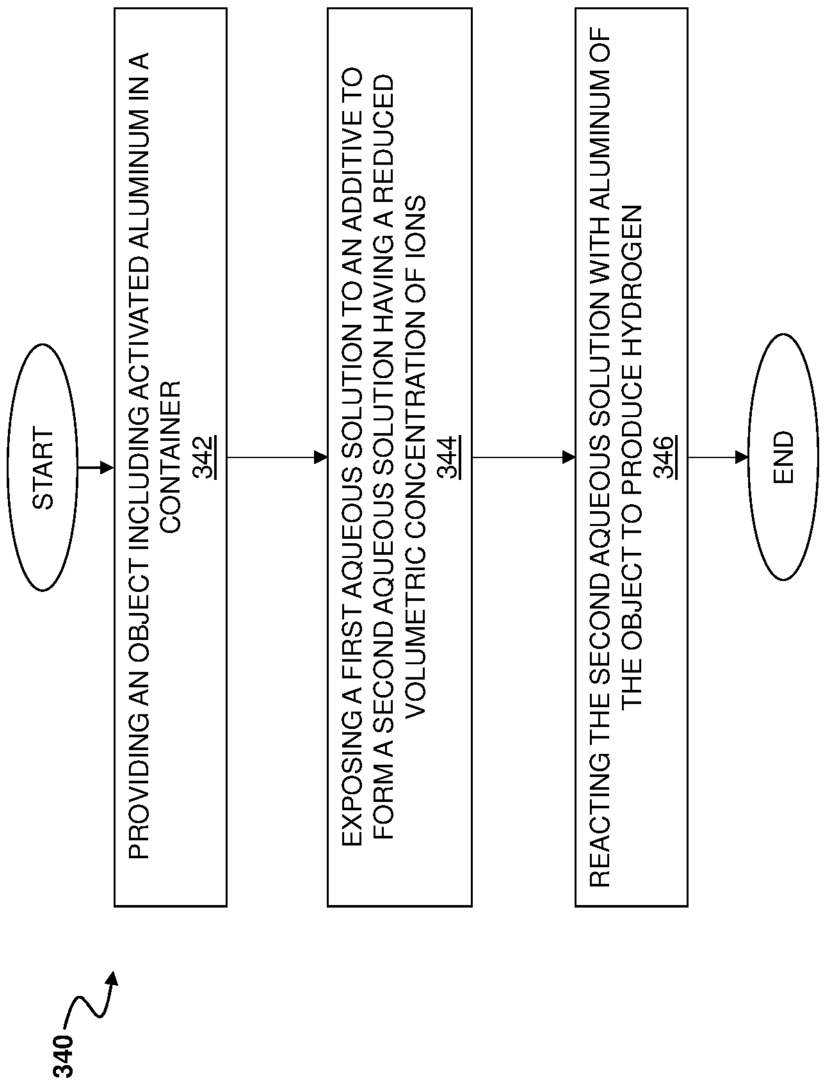
FIG. 3 is a flow chart of an exemplary method of producing hydrogen from water-reactive aluminum.

FIG. 3 is a flow chart of an exemplary method 340 of producing hydrogen from water-reactive aluminum. Unless otherwise indicated or made clear from the context, it shall be understood that the exemplary method 340 may be carried out using any form of activated aluminum described herein, along with any one or more of the additives described herein. Thus, for example, while the exemplary method 340 may be carried out using the moisture-stabilized material 100 (FIGS. 1A-1C) and/or the moisture-stabilized material 100' (FIG. 1D) including the salt 104, it shall be understood that the exemplary method 340 may be carried out using an activated aluminum object that has not been moisture-stabilized, unless a contrary intent is indicated. Further, or instead, while one or more aspects of the exemplary method 340 may be carried out using the kit 220, it shall be understood that the exemplary method 340 may be carried out using one or more separately sourced components and/or in any one or more of various different types of receptacles, unless a contrary intent is expressed.

As shown in step 342, the exemplary method 340 may include providing an material in a container. The material may include activated aluminum reactable with water to form hydrogen (and if the water to activated aluminum ratio is low—for example, 7-10, to generate significant steam to aid in doing useful work). For example, the material may include a bulk volume, with the bulk volume including aluminum. In some instances, at least one activation metal may be disposed along the aluminum within the bulk volume. The at least one activation metal may be more noble than the aluminum. Further, or instead, the at least one activation metal may be wetted along grain boundaries of the aluminum within the bulk volume.

As shown in step 344, the exemplary method 340 may include exposing a first aqueous solution to an additive to form a second aqueous solution having a reduced volumetric concentration of ions. That is, the first aqueous solution may have a first concentration of ions. Exposing the first aqueous solution to the additive may reduce the volumetric concentration of ions to form a second aqueous solution having a second concentration of ions lower than the first concentration of ions associated with the first aqueous solution. Importantly, it shall be appreciated that exposure of the first aqueous solution may be carried out in the container, with or without the material disposed therein. Additionally, or alternatively, the first aqueous solution may be exposed to the additive outside of the container, and the second aqueous solution may be added to the container with or without the material disposed therein.

In certain instances, the ions in the first aqueous solution may include ions originating from the source of water itself, such as is generally the case when the water has not been deionized prior to introducing the material. Additionally, or alternatively, the material may be moisture-stabilized using one or more salts according to the various different techniques described herein. In such instances, the step 342 of providing the material in a container may include dissolving the one or more salts from an outer surface of the bulk volume such that the first aqueous solution additionally or alternatively includes cations and anions attributable to dissolution of the one or more salts in water. For example, in implementations in which the salt used for moisture-stabilization is table salt (NaCl), the first aqueous solution may be salt water and may or may not have salinity of salt water originating from the sea. Independent of the source of the ions in the first aqueous solution, the presence of the ions in the first aqueous solution may generally interfere with the hydrogen yield from the activated aluminum of the material, as evidenced by the experimental results discussed below.

In general, the additive may reduce the volumetric concentration of the ions in the first aqueous solution to form a second aqueous solution. Stated differently, through interaction between the additive and the first aqueous solution, the second aqueous solution may have a second concentration of ions less than a first concentration of ions in the first aqueous solution. In instances in which the material is moisture-stabilized with a salt, the additive may remove at least some of the cations and anions originating from dissolution of the salt. That is, the additive may be understood to at least partially reverse the moisture-stabilization initially provided by the salt prior to dissolution in water. Further, or instead, to the extent that the water itself (e.g., brackish water, salt water, chlorinated water, etc.) is a source of ions in the first aqueous solution, the additive may be understood to treat the water to remove certain contaminants—namely, ions—that interfere with reacting the activated aluminum to produce hydrogen.

In general, the additive may be added in a quantity at least above a threshold useful for promoting the reaction of the aluminum with water to produce hydrogen. In some instances, such a quantity may be a predetermined amount, such as may be useful for making efficient use of the additive. In other instances, however, the additive may be introduced into the first aqueous solution until vigorous hydrogen production is observed. This may be particularly useful in instances in which accurate measurements of the additive may be difficult, given the nature of the additive and/or given conditions in the field.

As shown in step 346, the exemplary method 340 may include, in the container, reacting the second aqueous solution with the aluminum of the bulk volume to produce reaction products including hydrogen, steam, and heat, each of which may have potential uses as energy sources individually or in combination with one another. As discussed in greater detail below, it has been experimentally observed that the additive may significantly increase the hydrogen yield from the reaction of aluminum and water while also significantly decreasing the amount of time required for the formation of hydrogen to take place. Given these trends, it shall be appreciated that the additive may generally facilitate rapid production of a large quantity of hydrogen-containing gas, such as may be useful for the rapid inflation of a lifting structure (e.g., a balloon). Further, given that the various steps of the exemplary method 340 do not require tight controls, such rapid production of a large quantity of hydrogen-containing gas may be readily achieved in a variety of end-use locations, even those associated with remote and/or harsh conditions.

Having described various aspects of using salts for moisture-stabilization of activated aluminum and various aspects of using additives to reverse moisture-stabilization and/or to reduce ionic concentration naturally present in local water sources, attention is now directed to experimental results demonstrating, among other things, the viability of common salts as moisture-stabilizing agents and identification of certain common characteristics of additives that are useful for achieving high hydrogen yields from aqueous solutions with ionic content.

EXPERIMENTAL RESULTS

The following experiments demonstrate controlling reactability of activated aluminum according to various different techniques described herein. It is to be understood that these experiments and corresponding results are set forth by way of example only, and nothing in these examples shall be construed as a limitation on the overall scope of this disclosure.

1. Experimental Procedure

For each test described below, a known mass of activated aluminum (approximately 0.25 g) was reacted in a water mixture (approximately 4 mL) including one or more additional constituent components appropriate for the given test. The volume of hydrogen produced for each test was measured using an inverted column of water into which was bubbled the hydrogen produced during a given test. The hydrogen yield for each test was determined as the ratio (expressed as a percentage) of the measured volume of hydrogen produced to the theoretical volume producible from complete reaction of the known volume of activated aluminum with water.

II. Moisture-Stabilization Test Results

In this subset of tests, salt water was diluted with deionized water such that the source of salinity in each case was sodium chloride (NaCl) originating from sea salt. The measured reduction in hydrogen yield shall be understood to be a proxy for the usefulness of the given salinity as a moisture-stabilization agent to be applied to an outer surface of a bulk volume including activated aluminum, as described herein.

Figure 4:
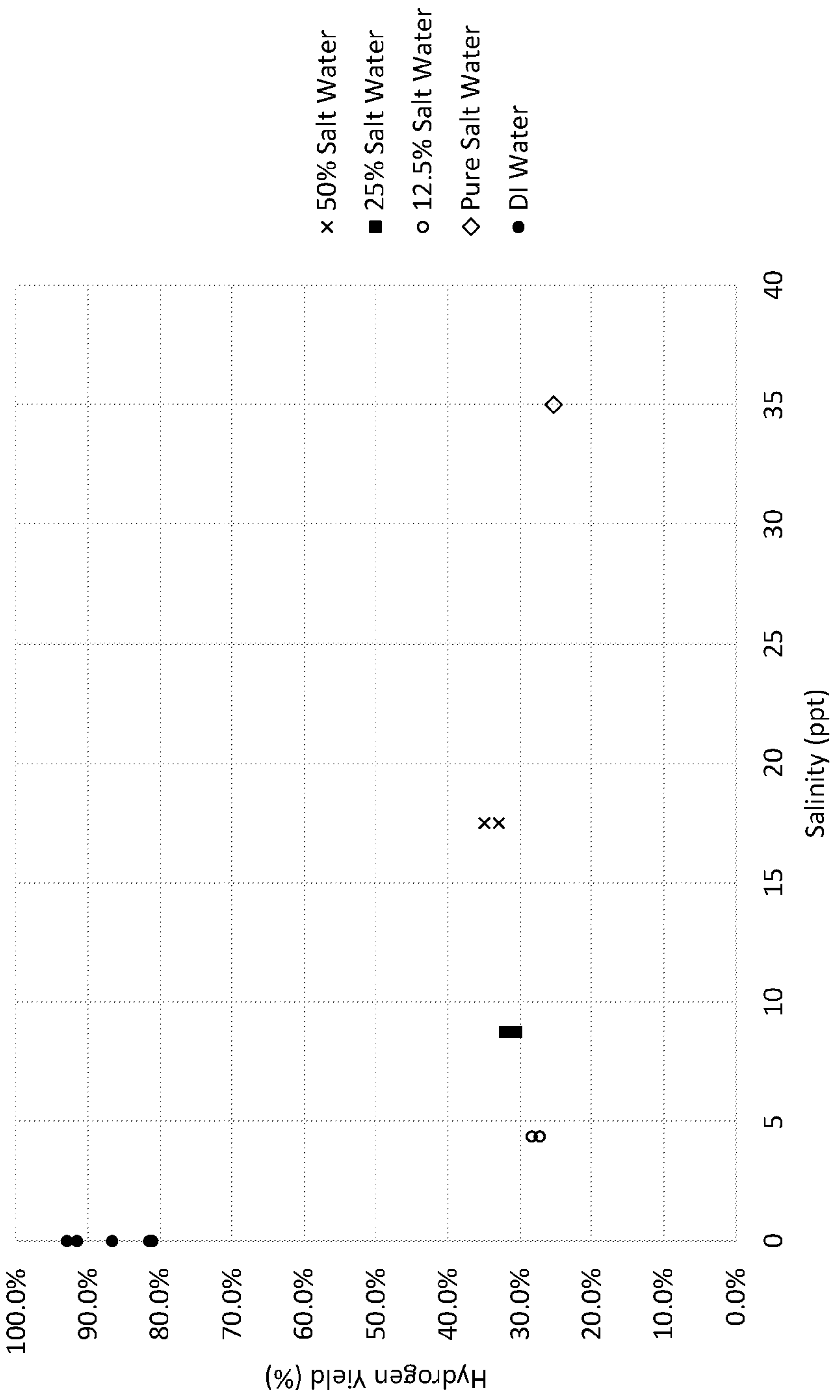
FIG. 4 is a graph of hydrogen yield as a function of salinity of various concentrations of salt water used to react with activated aluminum.

Referring now to FIG. 4A, the impact of salinity of an aqueous solution on the hydrogen yield of activated aluminum was measured. In particular, salinity concentrations ranging from zero (deionized (DI) water) to 35 ppt (typical of salt water in the ocean) were used to quantify the effectiveness of sodium chloride (NaCl) as a salt for moisture-stabilization according to the techniques described herein. As may be appreciated from these results, the hydrogen yield of activated aluminum decreases substantially—by greater than a factor of approximately 3—with just a small amount of salinity (about 4 ppt) present in the aqueous mixture. Accordingly, only a relatively small amount of NaCl may be needed for moisture-stabilization in some cases. However, in other cases, the use of additional amounts of NaCl may be necessary or useful to achieve complete or substantially complete (e.g., greater than about 95 percent) coverage of the surface area of a bulk volume containing activated aluminum with the NaCl in crystalline to act as a barrier to moisture incident on the moisture-stabilized material.

In these results, it is also notable that hydrogen yield of the activated aluminum in deionized water varied significantly from about 80 percent to about 95 percent under nominally identical conditions. Without wishing to be bound by theory, it is believed that such variation may be at least partially attributable to variations in copper content of the various samples tested, as copper is a common trace element in many commercially available aluminum alloys. Copper is known to inhibit the reaction of activated aluminum with water to produce hydrogen. As described in greater detail below, however, certain additives tested may counteract the impact of copper impurities and, thus, improve the consistency and efficiency of hydrogen yield across activated aluminum with varying amounts of copper.

Other types of salts were also tested and observed to have similar moisture-stabilization properties as sodium chloride. Specifically, aqueous solutions including baking soda (sodium bicarbonate, $NaHCO_3$) and Epsom salt (magnesium sulfate in a heptahydrate form, $MgSO_4 \cdot 7H_2O$) were also tested and found to have low hydrogen yields and long reaction times as compared to reaction of activated aluminum in deionized water. Thus, collectively, these results indicate that any one or more of various different types of salts may be used to moisture-stabilized activated aluminum according to the techniques described herein. This is significant as it may facilitate using off-the-shelf and widely available material for moisture-stabilization, without the need for specialized treatment or preparation. In some instances, therefore, moisture-stabilization may be applied—or even reapplied—in the field as needed.

III. Additive Test Results

In this subset of tests, two broad categories of additives were tested: i) food-grade consumables; and 2) other materials. Materials in each of these categories warrant investigation as potential additives at least because such materials are safe and widely available. In particular, several of these materials may already be part of provisions carried by personnel in the field, thus adding no significant burden in terms of the supply chain. Each material tested in each of these groups was tested for the potential to promote hydrogen production from activated aluminum in the presence of salt water. In this context, the potential for a given material as an additive for promoting hydrogen production was generally characterized by an increase in hydrogen yield relative to hydrogen yield achieved without the material. For several of these materials, the impact of the material on the time to react the activated aluminum was also quantified to ascertain the usefulness of certain materials for tailoring an overall reaction time for a given application, with some applications benefiting from slower reaction times and other applications benefiting from faster reaction times.

i. Food-Grade Consumables

Figure 5A:
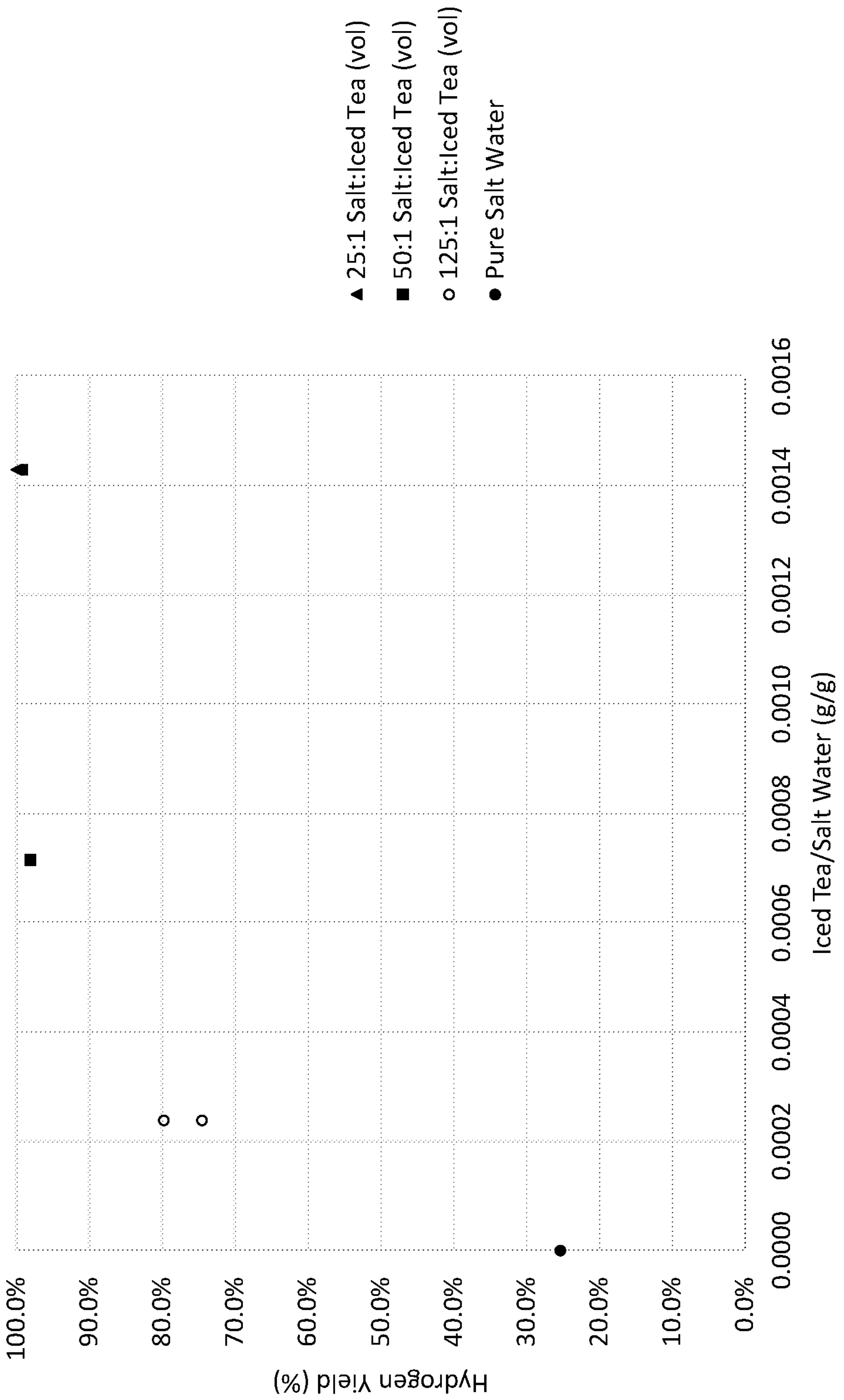
FIG. 5A is a graph of hydrogen yield as a function of different mass ratios of salt to iced tea powder in aqueous solutions used to react with activated aluminum.

Referring now to FIG. 5A, the effectiveness of different concentrations of iced tea on hydrogen yield of activated aluminum in salt water was measured. The type of iced tea used was Lipton® Unsweetened Iced Tea powdered mix, available from Unilever US, Inc., Englewood Cliffs, New Jersey, United States. In each case, the salt water used was seawater with nominal salinity of 35 ppt.

The addition of small amounts of the powered iced tea mix results in significant improvement (over a factor of 2) in hydrogen yield as compared to hydrogen yield with the salt water alone. As may be appreciated by the trend in the measured data, the addition of at least 0.0005 g of powdered iced tea mix to 1 g of salt water allows the activated aluminum to react with over 90 percent hydrogen yield. By increasing the mass ratio of the powdered iced tea mix to salt water, the activated aluminum was observed to react to completion (100 percent hydrogen yield).

Figure 5B:
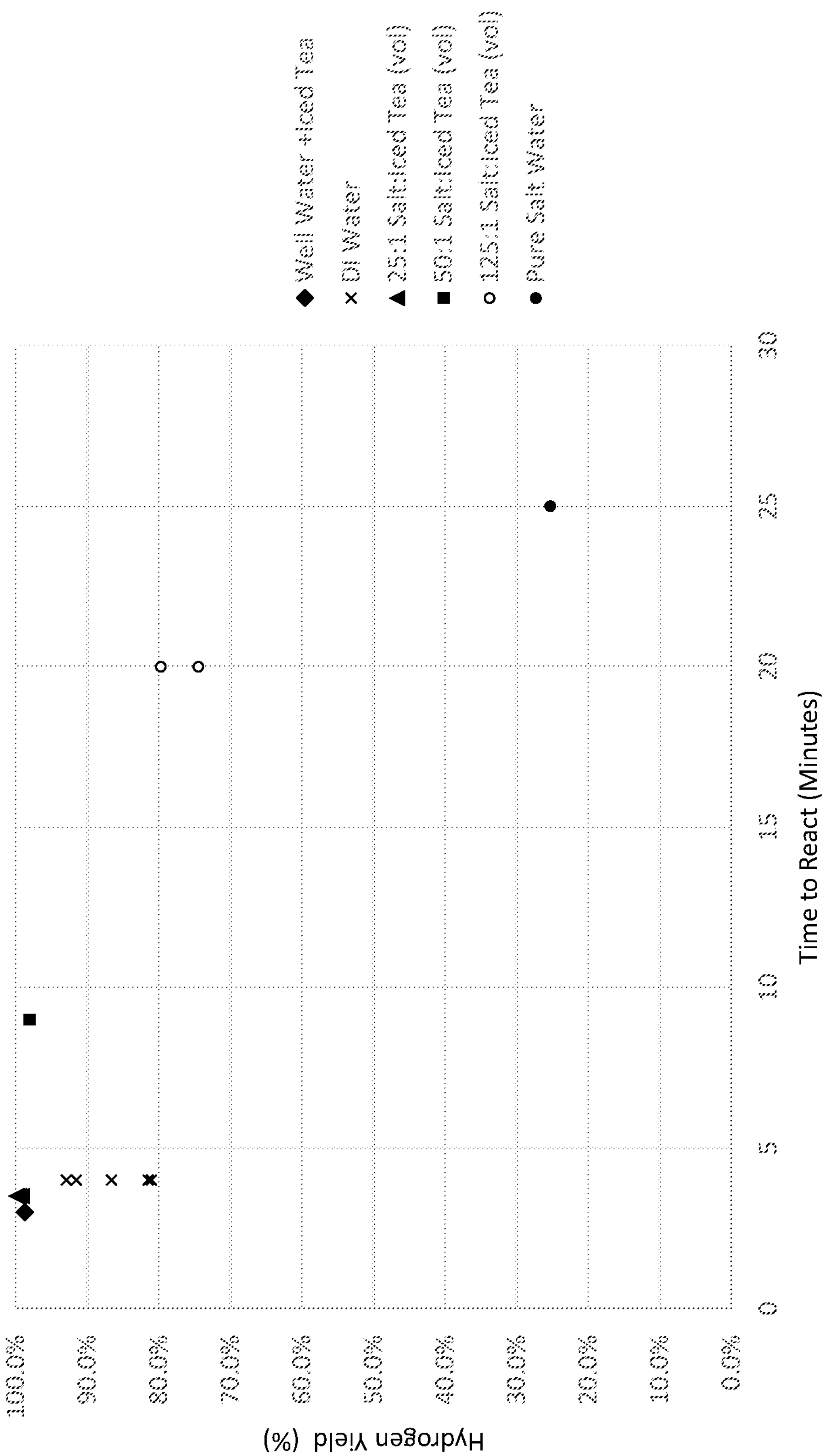
FIG. 5B is a graph of hydrogen yield as a function of reaction time for the different mass ratios of salt to iced tea power shown in FIG. 5A and for different types of water used to react with activated aluminum.

Referring now to FIG. 5B, the impact of the powered iced tea mix was also observed with respect to the reaction time of the activated aluminum in the salt water to produce hydrogen. The pure salt water baseline test required about 25 minutes to produce a hydrogen yield of about 25 percent. This is, once again, a demonstration of the impact of salinity on the reaction of activated aluminum with water to produce hydrogen. For reference, the hydrogen yield and reaction time for activated aluminum in deionized (DI) water is also shown. With reaction time of less than 5 minutes and hydrogen yields between 80 percent and 95 percent, it shall be appreciated that deionized water data serve as a useful comparator for an upper bound of performance.

As shown, in an aqueous mixture having a ratio of 125:1 salt to iced tea by volume, hydrogen yield from activated aluminum is increased significantly relative to the hydrogen yield from activated aluminum in pure salt water, while the time to react remained slow (about 20 minutes). With the addition of more iced tea to salt water at a ratio of 50:1 salt to iced tea by volume in the aqueous mixture, the hydrogen yield was observed to increase to 98 percent, while the time to react decreased to below 10 minutes. The addition of still more iced tea—at a ratio of 25:1 salt to iced tea by volume in the aqueous mixture—the activated aluminum reacted to completion (100 percent hydrogen yield) in less than 4 minutes.

In view of the foregoing, it shall be appreciated that activated aluminum may be reacted in salt water to produce 100 percent hydrogen yield in under five minutes. Importantly, this demonstrates that a large amount of hydrogen is producible by activated aluminum and salt water through the addition of an amount of powdered iced tea mix typically consumed by people. Such amounts may be readily carried by personnel as part of food provisions used in the field, thus making powdered iced tea mix a practical additive for hydrogen production in remote locations.

Further, the aqueous mixture of 25:1 salt to iced tea by volume improved hydrogen yield and reduced the reaction time of activated aluminum relative to the respective metrics measured for activated aluminum in deionized water, while also reducing observed variability in the hydrogen yield over multiple tests. These improvements were unexpected, given that the reaction of activated aluminum in deionized water was thought to represent the upper bound of hydrogen production. Without wishing to be bound by theory, it is believed that the observed improvements in hydrogen production from activated aluminum in the aqueous mixture of 25:1 salt to iced tea by volume relative to hydrogen production from activated aluminum in deionized water are attributable to the interaction between iced tea and copper impurities in the activated aluminum. That is, it is believed that a component of the iced tea bonds to the copper through chelation, thus neutralizing copper as an inhibitor to the reaction between activated aluminum and water. Given the test results observed with other food-grade consumables (described below) and the small amount of powdered iced tea mix required to achieve this result, it is believed that such chelation of copper may be attributable to dietary flavonoids in the iced tea.

A combination of well water and iced tea was also tested to demonstrate the effectiveness of the powered iced tea mix in neutralizing ionic content (e.g., calcium) found in local fresh-water sources that may be at or near an end-use location of the activated aluminum in the field. As shown, the effectiveness of an aqueous solution of iced tea and well water was generally as effective as the aqueous mixture of 25:1 salt to iced tea in promoting hydrogen production from activated aluminum. Thus, significantly, the same type of additive may be used to treat various different types of local water sources encountered in the field, regardless of whether such local sources are salt water, brackish water, fresh water from a municipal source, fresh water from a well, etc.

Figure 6:
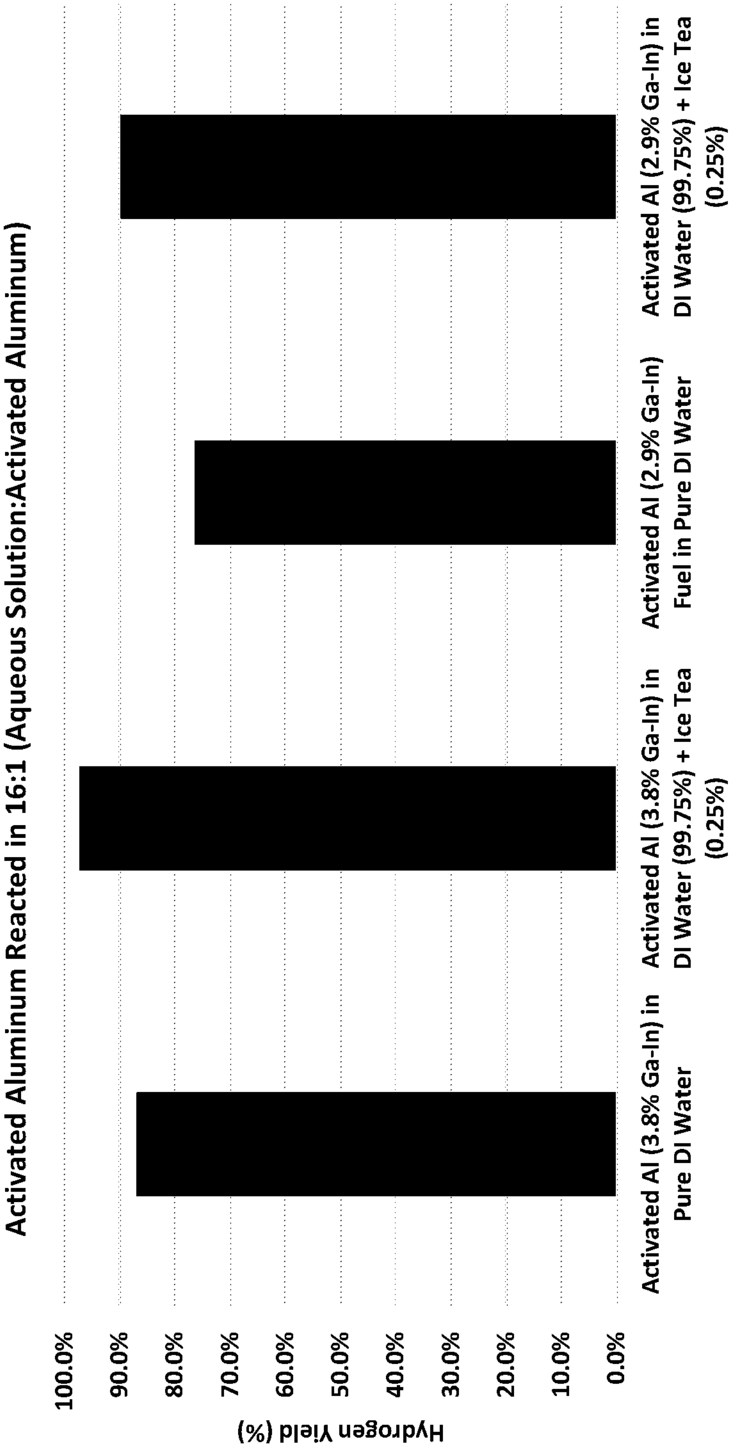
FIG. 6 is a bar chart of hydrogen yield for different compositions of activated aluminum reacted in water with and without iced tea as an additive.

Referring now to FIG. 6, the influence of the amount of activation metal used in the activated fuel composition was tested relative to the effectiveness of iced tea as an additive. In a first composition that was tested, activated aluminum included 3.8% (of total mass) gallium-indium alloy (Ga—In) wetted along grain boundaries of the aluminum. In a second composition that was tested, activated aluminum included 2.9% Ga—In (of total mass) wetted along grain boundaries of the aluminum. Each of these compositions was tested with and without iced tea as an additive. For those tests including iced tea, the aqueous solution was 0.25% iced tea and 99.75% deionized water (by volume). For each test in this subset, activated aluminum was reacted in a 16:1 (aqueous solution:activated aluminum by mass).

As may be appreciated by comparing the hydrogen yields associated with the two tests carried out without the use the iced tea additive, increasing the amount of Ga—In wetted along the grain boundaries of aluminum from 2.9% to 3.8% of the total mas of the activated aluminum increased hydrogen yield by about ten percent. Without wishing to be bound by theory, this suggests that adding more Ga—In results in better wetting along the grain boundaries, which helps promote the spalling corrosion that exposes raw aluminum to water throughout the reaction. While this may suggest that it is generally possible to achieve gains in hydrogen yield by using more activation metal, that the cost of such activation metal presents practical limits to this approach.

As may further be appreciated from these results, the hydrogen yield achieved by reacting an aqueous solution containing iced tea with activated aluminum containing 2.9% Ga—In is greater than the hydrogen yield achieved by reacting pure deionized water with activated aluminum containing 3.8% Ga—In. This demonstrates that the addition of just a small amount of iced tea to an aqueous solution may facilitate forming activated aluminum with less activation metal while still achieving the same or better hydrogen yield. Given the cost of Ga—In, this finding is quite significant with respect to reducing the cost associated with forming hydrogen from activated aluminum.

As shown in Table 1 below, several other types of food-grade consumables were tested as potential additives for facilitating the reaction of activated aluminum to produce hydrogen in an ion-containing aqueous mixture.

TABLE 1

Reaction time and reactivity of activated aluminum in aqueous solutions of salt water (35 ppt salt) and different types of beverages.

| Composition of Aqueous Solution (percentage by volume) | Time to React (minutes) | Reactivity/notes |
|---|---|---|
| Salt Water and 20% Tang drink prepared from Tang Drink Powder according to manufacturer's recommended concentration (Tang Drink Powder is available from Mondelez International, Inc. of Chicago, Illinois, United States). | 7:00 | Mostly complete, some left to react |
| Salt Water and 10% Tang drink | 8:30 (test ended) | Incomplete Reaction - less than 20% tang drink |
| Salt Water and 20% lemon drink prepared from Country Time Lemonade powdered drink mix available from available from The Kraft Heinz Company of Glenview, Illinois, United States | 9:30 | Mostly Complete Reaction, some left to react |
| Salt Water and 10% lemon drink | 10:30 (test ended) | Incomplete Reaction - less than 20% lemon drink |
| Salt Water and 20% orange soda | 5:45 | Complete reaction - created nice powder |
| Salt Water and 10% orange soda (Crush orange soda, available from Keurig Dr Pepper of Burlington, MA, United States) | 6:30 | Mostly complete reaction, some powder created |
| Salt Water and 5% orange soda | 10:20 (test ended) | Incomplete Reaction - less than 10% orange soda |
| Salt Water and 20% lemon-lime soda (Sprite ® lemon-lime soda, available from The Coca-Cola Company of Atlanta, Georgia, United States) | 6:30 | Complete reaction - created nice powder |
| Salt Water and 10% lemon-lime soda | 8:30 | Mostly complete reaction, some powder created |
| Salt Water and 5% lemon-lime soda | 10:20 (test ended) | Incomplete Reaction - less than 10% lemon-lime soda |
| Salt Water and 20% Instant coffee (coffee beverage prepared) | 2:00 | Complete reaction |
| Salt Water and 10% Instant coffee (coffee beverage prepared) | 2:45 | Complete reaction |

TABLE 1-continued

Reaction time and reactivity of activated aluminum in aqueous solutions of salt water (35 ppt salt) and different types of beverages.

| Composition of Aqueous Solution (percentage by volume) | Time to React (minutes) | Reactivity/notes |
|---|---|---|
| Salt Water and 5% Instant coffee (coffee beverage prepared) | 3:45 | Complete reaction |
| Salt Water and 1% Instant coffee (coffee beverage prepared) | 5:30 | Complete reaction -some residual aluminum left |

While each of the food-grade consumables listed in Table 1 demonstrated some improvement in reaction time and reactivity (a qualitative assessment of hydrogen yield), these results nevertheless suggest a useful categorization among food-grade consumables found to be effective. Specifically, the Tang drink, lemon drink prepared from a powdered drink mix, orange soda, and lemon-lime soda were found to reduce reaction time and improve reactivity, but required large amounts of the respective food-grade consumable (10-20 percent by volume in the aqueous mixture) to achieve such improvements. The coffee beverage prepared from instant coffee (coffee crystals), however, was found to be more volumetrically efficient in promoting reaction of activated aluminum in an aqueous solution including salt water, requiring only 1 percent by volume of the coffee beverage in the aqueous mixture to achieve complete reaction of the activated aluminum with a reduced time to react. Thus, a large amount of hydrogen is producible from activated aluminum in salt water through the addition of a coffee beverage in an amount that is normally consumed by people. Such amounts of instant coffee may be readily carried by personnel as part of food provisions used in the field, thus making instant coffee a practical additive for hydrogen production in remote locations.

The similar volumetric efficiency observed for both the coffee beverage and the iced tea in promoting complete reaction of activated aluminum in salt water suggests that food-grade consumables rich in dietary flavonoids (sometimes referred to as biophenols)—present in substantial quantities in both coffee and iced tea as well as many types of fruits, vegetables and even grains and legumes—are a particularly useful category of food-grade consumables useful as additives for the techniques described herein. That is, as compared to food-grade consumables containing only acid (e.g., ascorbic acid, citric acid, or a combination thereof), much smaller amounts of food-grade consumables containing dietary flavonoids are required to facilitate production of large amounts of hydrogen from activated aluminum and salt water. Specifically, it is important to note that dietary flavonoids were observed to be effective for such hydrogen production in flavoring proportions in which these food-grade consumables are typically consumed. In other words, for the powdered or dehydrated drinks, from coffee to iced tea to fruit beverages, adding the drink powder to the salt water in an amount that would normally be added to fresh water to make a drink of typical concentration is sufficient to create a robust and efficient reaction of activated aluminum with salt water. This is a substantial benefit in field applications, given that additives may be readily sourced from food provisions already carried by personnel or readily found at or near the end-use location.

Figure 7A:
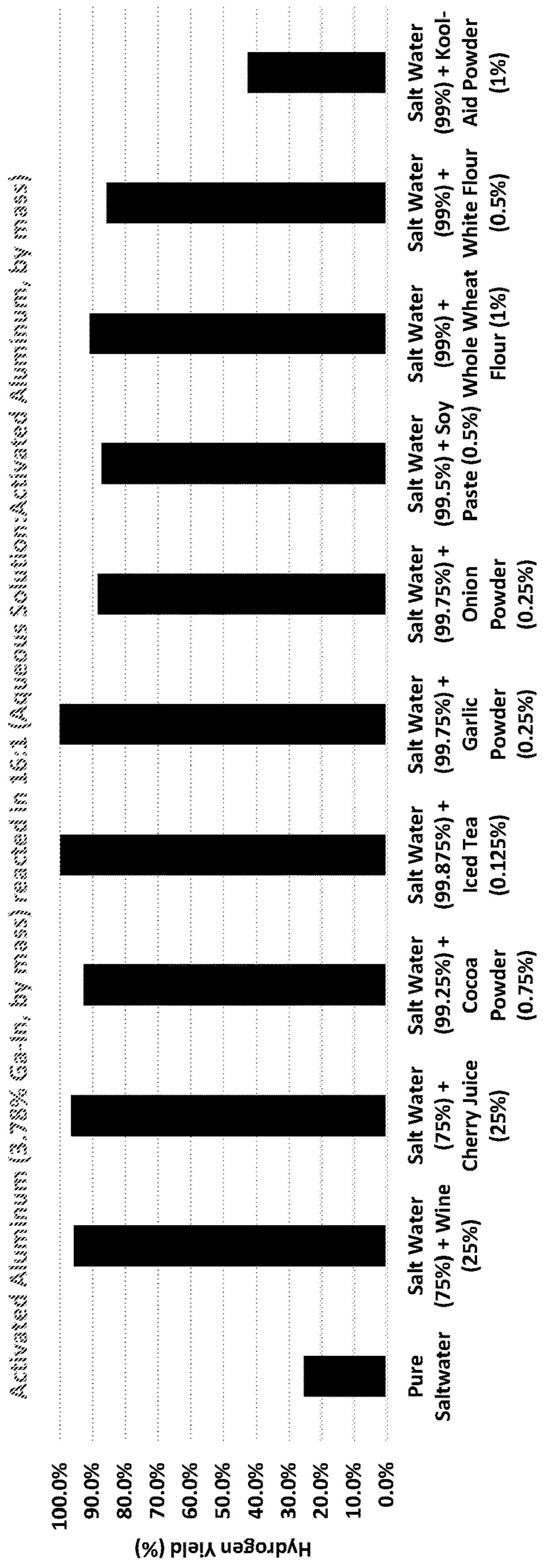
FIG. 7A is a bar chart of hydrogen yield for salt water relative to combinations of salt water and food grade consumables containing flavonoids used to react with activated aluminum.
Figure 7B:
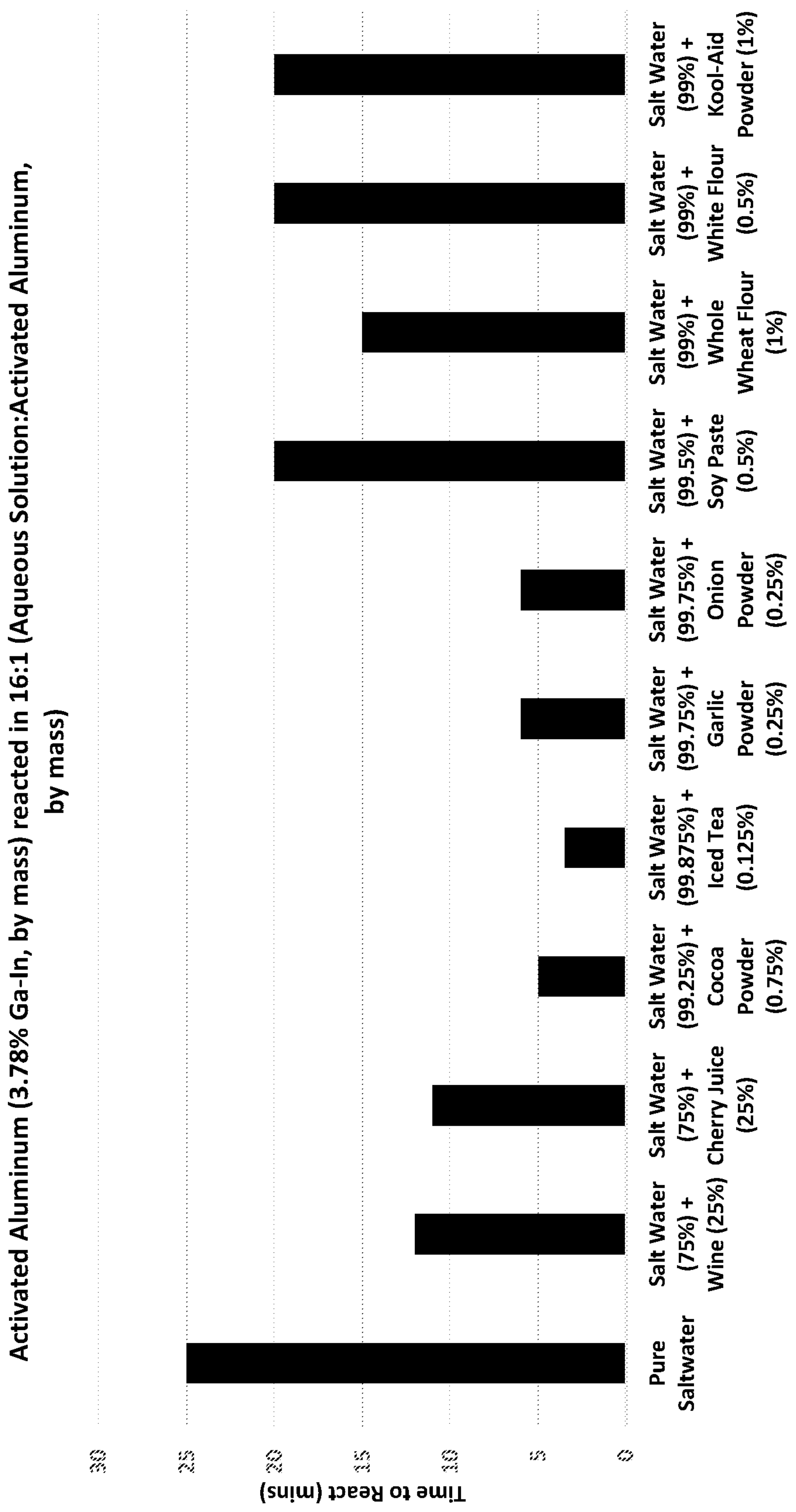
FIG. 7B is a bar chart of time to react for salt water relative to the combinations shown in FIG. 7A.

Referring now to FIGS. 7A and 7B, the effectiveness of dietary flavonoids in promoting hydrogen production from activated aluminum in salt water was tested across a variety of other food-grade consumables. Specifically, the effectiveness of Kool-Aid® powder (available from The Kraft Heinz Company of Glenview, Illinois, United States), wine, cherry juice, orange juice, cocoa powder, garlic powder, onion powder, soy paste, whole wheat flour, and white flour are shown, along with the effectiveness of powdered iced tea for comparison. Other tasty fruit juices high in dietary flavonoids, such as often found in the tropics, are also thus expected to provide similar fuel reaction benefits. For each of these food-grade consumables, the hydrogen yield measured was greater than the hydrogen yield of activated aluminum in pure salt water (25 percent). In the case of Kool-Aid® powder, which does not have an abundance of natural dietary flavonoids but has much refined sugar and artificial flavors, relative to pure salt water, the improvement of hydrogen yield was modest-increasing from 25 percent to about 43 percent. The improvements in hydrogen yield associated with using the other food-grade consumables shown in the figure was greater than a factor of 3, with all of other food-grade consumables resulting in hydrogen yields greater than 85 percent and some (wine, cherry juice, garlic powder, and whole wheat flour) resulting in hydrogen yields greater than 90 percent. In particular, the use of garlic powder strongly promotes the health of the reaction as it resulted in a hydrogen yield of 100 percent.

The difference in performance between Kool-Aid® powder and the other food-grade consumables is informative of the significance of dietary flavonoids in improving hydrogen yields from activated aluminum in salt water. Specifically, the Kool-Aid® powder includes "citric acid, potassium citrate, gum arabic, sucralose (sweetener), contains less than 2% of artificial flavor, acesulfame potassium (sweetener), sucrose acetate isobutyrate, Red 40, Blue 1, sodium benzoate and potassium sorbate. Thus, the modest effectiveness of the Kool-Aid® powder in increasing hydrogen yield may be attributable to the citric acid contained in the Kool-Aid® powder. The other food-grade consumables that were shown to increase hydrogen yield by greater than a factor of 3 each included dietary flavonoids. Taking these results together, therefore, it shall be appreciated that dietary flavonoids are substantially more effective in promoting hydrogen yield as compared to the effectiveness of artificial or refined ingredients or citric acid, making dietary flavonoids volumetrically more efficient as additives to be used in field applications.

The effectiveness of these food-grade consumables in reducing reaction time of activated aluminum in salt water was also observed. Relative to the reduction in reaction time achieved using pure salt water. Kool-Aid® powder, soy paste, and white flour each demonstrated a modest improvement-reducing the reaction time from 25 minutes to 20 minutes. Wine and cherry juice each reduced the reaction time approximately in half relative to the reaction time of activated aluminum in salt water. The largest reductions in reaction time relative to pure salt water were observed in the tests corresponding to cocoa powder, garlic powder, and onion powder, each of which were at or slightly above 5 minutes and, thus, slower than the reaction rate achieved with iced tea.

Here again, a comparison of the performance of the Kool-Aid® powder to the the other food-grade consumables is informative. In particular, certain food-grade consumables that are rich in dietary flavonoids were substantially better at reducing the reaction time, as compared to the reduction observed using the Kool-Aid® powder. This suggests that, as compared to an acid such as citric acid, some food-grade consumables may be better suited as additives used to speed up hydrogen production from activated aluminum in field applications that are time-sensitive.

Further, by comparing hydrogen yield results with the time to react for the various different food-grade consumables shown, it should be appreciated that certain food-grade consumables can significantly increase hydrogen yield while having a relatively lower impact on the reaction rate. For example, soy paste is one such food-grade consumable. Specifically, soy paste increases hydrogen yield from 25 percent to about 87 percent while only reducing the reaction time from 25 minutes to 20 minutes. This may be particularly advantageous for achieving high hydrogen yield with a "slow burn" (a reaction over a longer period of time) that may be generally easier to control in the field and, thus, useful for applications that are not time-sensitive. Further, it is believed that soy in powder form may perform similarly to garlic powder, offering both high hydrogen yield and short reaction time. Soybean products in various forms are widely available in many parts of the world. Accordingly, such soybean products may be particularly available and, hence, useful as an additive for increasing reaction efficiency. More generally, therefore, one or more food-grade consumables in any one or more of various different available forms may be selected for use in any one or more of the various different additives described herein to achieve a high hydrogen yield with a reaction profile appropriate for a given application in the field.

Other foods that are rich in dietary flavonoids were also observed to be similarly effective in promoting the reaction of activated aluminum in salt water to produce hydrogen. Some examples of other food-grade consumables that were tested and found to be effective in promoting hydrogen production from activated aluminum in salt water include: mint tea, black tea, chocolate milk, citrus fruits, and beer. However, given the wide range of food-grade consumables that include dietary flavonoids, this list shall be understood to be exemplary and not limiting. In each case tested, only small amounts of each food-grade consumable were required in concentrations consistent with flavoring proportions in which each food-grade consumable is typically used for consumption—without a need for specialized concentration. In the context drinks and drink mixes tested, the flavoring proportions typically used for consumption include concentrations from "weak" to "strong." which may include concentrations from half to twice the suggested amount on a food label. Thus, quite significantly, food-grade consumables that are rich in bioflavonoids may be carried as extra food provisions by personnel and either consumed by personnel in the field or used as an additive for promoting hydrogen production, as needs dictate.

In certain instances, the end-use of the hydrogen produced from the activated aluminum may factor into selection of an appropriate food-grade consumable to use as an additive. For example, for the production of hydrogen that is intended to be used in an application that is sensitive to sulfur (e.g., a fuel cell), tea or another similar food-grade consumable that does not release sulfur may be selected.

ii. Other Materials

Having described the usefulness of certain food-grade consumables as additives for promoting hydrogen production from activated aluminum and salt water, attention is now directed to test results associated with the use of urine and common industrial-strength acids as additives.

Figure 8A:
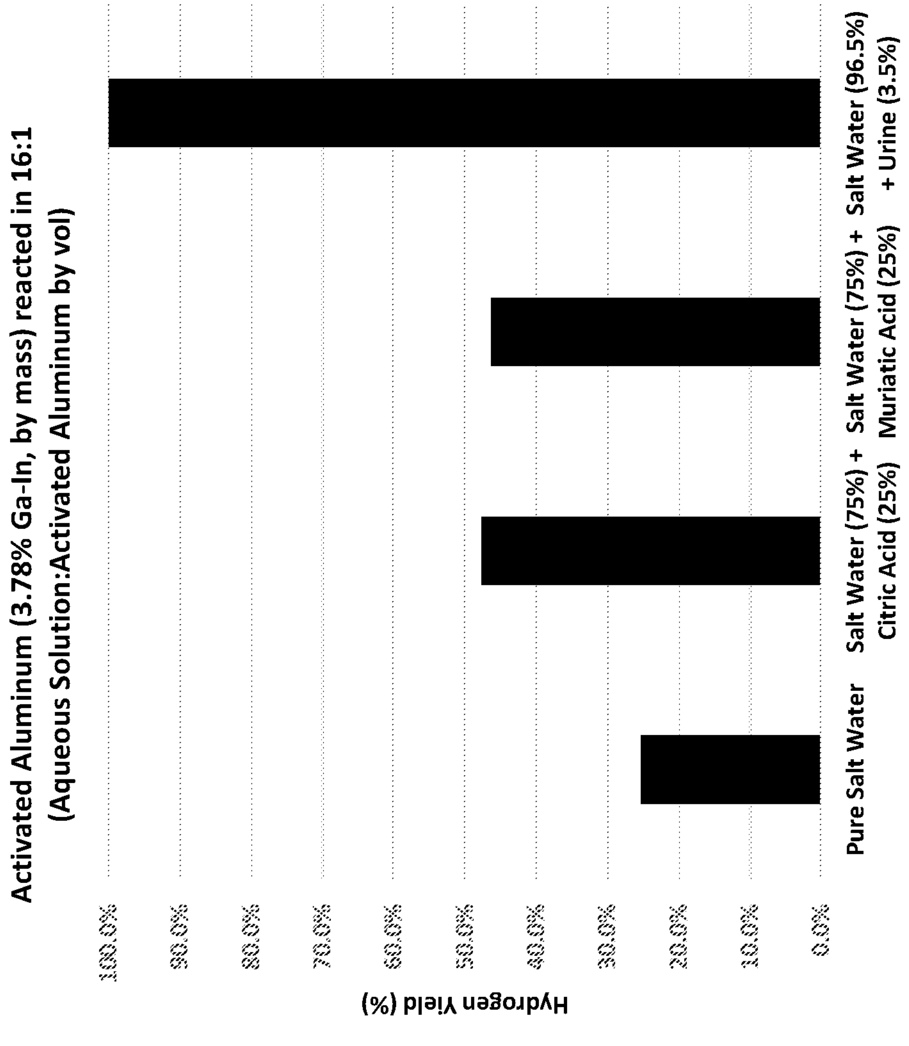
FIG. 8A is a bar chart of hydrogen yield for salt water relative to combinations of salt water and industrial acid and salt water and urine used to react with activated aluminum.
Figure 8B:
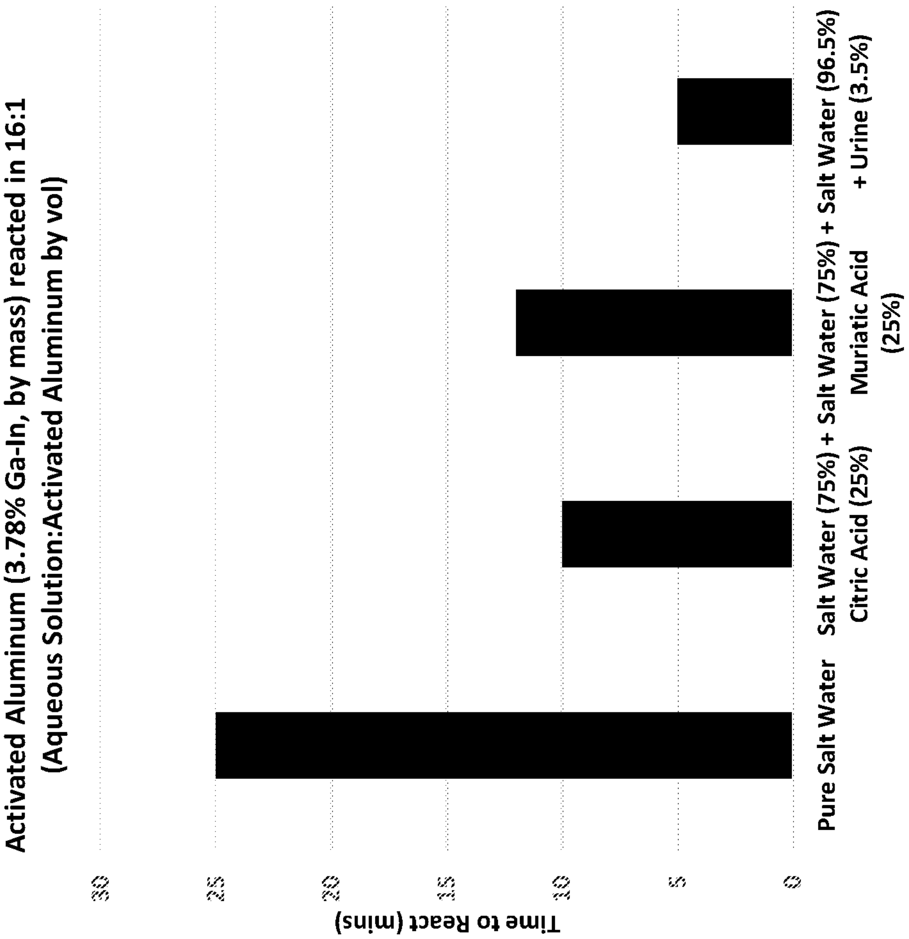
FIG. 8B is a bar chart of time to react for salt water relative to the combinations shown in FIG. 8A used to react with activated aluminum.

Referring now to FIGS. 8A and 8B, it shall be appreciated that an aqueous solution containing a small volumetric percentage (3.5%) of urine is quite effective as an additive-achieving 100 percent hydrogen yield in 5 minutes. Of the additives tested, only iced tea demonstrated better performance, requiring less than 5 minutes to achieve 100 percent hydrogen yield. Without wishing to be bound by theory, the effectiveness of urine in increasing hydrogen yield and reducing reaction time is believed to be attributable to the presence of dietary flavonoids in urine.

As may be readily appreciated, the effectiveness of urine as an additive for promoting hydrogen production from activated aluminum and salt water is useful for field applications. That is, as a natural human waste product, urine may be readily obtained from personnel in the field. Further, given the small amount of urine required to achieve significant benefits, the amount of urine required to produce a large quantity of hydrogen (e.g., enough hydrogen to launch a 1 $m^3$ balloon every hour for 24 hours) from activated aluminum is within the normal amount of urine typically excreted per day by two healthy adults.

While effective as an additive, it is useful to note that the use of urine as presents challenges. The reaction smells bad. Further, given variations in diet, the composition of urine is quite variable. In particular, to the extent dietary flavonoids in urine contribute to its effectiveness, the effectiveness of a given sample of urine may be variable in unpredictable ways. Such variation may be at least partially addressed by using one or more sensors (e.g., a pH strip to determine the amount of uric acid in the urine) to determine composition of the urine and using this information to determine an appropriate amount of urine to be used as an additive.

Given the variability associated with urine, industrial-strength acids were also tested as potential candidates to be used as an additive for promoting hydrogen yield from activated aluminum in salt water. In particular, citric acid and muriatic acid (31.45 percent acid by mass, also known as hydrochloric acid) were tested. As shown, relative to the baseline case of pure salt water, each of these acids were useful in approximately doubling the hydrogen yield of activated aluminum in salt water while reducing the reaction time in approximately in half. However, consistent with the results observed for food-grade consumables having only acid, the improvements observed with citric acid and muriatic acid each required large amounts (25 percent by volume) of the respective acid. Stated differently, as compared to the use of food-grade consumables that are rich in dietary flavonoids, the use of industrial-strength acids such as citric acid and muriatic acid is less volumetrically efficient. That is, food-grade consumables that are rich in dietary flavonoids are generally more portable options, relative to industrial-strength acids, as an additive for promoting hydrogen production of activated aluminum in salt water. Stated differently, industrial-strength acids may be useful as additives for producing hydrogen in end-use applications with few logistical concerns.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A kit comprising:

a moisture-stabilized material including a bulk volume, an activation metal, and a salt in crystalline form, the bulk volume including aluminum, the activation metal including gallium, the activation metal distributed within the aluminum of the bulk volume, and the salt in crystalline from on an outer surface of the bulk volume and dissolvable in water to form a first aqueous solution; and a container defining a volume, wherein the moisture-stabilized material is disposed in the volume of the container, and the container forms a gas-tight seal about the moisture-stabilized material in the volume of the container.

2. The kit of claim 1, further comprising an additive supported by the container apart from the moisture-stabilized material, wherein the additive is introducible into the first aqueous solution to form a second aqueous solution in which aluminum, with the activation metal distributed therein, has a hydrogen yield greater than 80 percent.

3. The kit of claim 2, wherein the additive includes one or more metals.

4. The kit of claim 2, wherein the additive includes one or more acids.

5. The kit of claim 2, wherein the additive includes one or more food grade consumables.

6. The kit of claim 2, wherein the moisture stabilized material and the additive are reactive with water in the volume of the container to form a hydrogen-containing gas.

7. The kit of claim 6, further comprising a first valve in fluid communication with the volume of the container, wherein the volume of the container is connectable in fluid communication with a water source via the first valve.

8. The kit of claim 6, further comprising a second valve in fluid communication with the volume of the container, wherein the volume of the container is connectable in fluid communication with a high-pressure gas tank via the second valve.

* * * * *